United States Patent
Simonsson et al.

(10) Patent No.: US 9,900,867 B2
(45) Date of Patent: Feb. 20, 2018

(54) USER EQUIPMENT AND A METHOD FOR TRANSMITTING SOUNDING REFERENCE SIGNALS

(71) Applicant: Telefonaktiebolaget L M Ericsson (publ), Stockholm (SE)

(72) Inventors: Arne Simonsson, Gammelstad (SE); Sara Landström, Luleå (SE); Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 48 days.

(21) Appl. No.: 14/889,935

(22) PCT Filed: May 16, 2013

(86) PCT No.: PCT/SE2013/050555
§ 371 (c)(1),
(2) Date: Nov. 9, 2015

(87) PCT Pub. No.: WO2014/185841
PCT Pub. Date: Nov. 20, 2014

(65) Prior Publication Data
US 2016/0119915 A1    Apr. 28, 2016

(51) Int. Cl.
*H04W 72/04* (2009.01)
*H04L 5/00* (2006.01)
(Continued)

(52) U.S. Cl.
CPC ......... *H04W 72/0413* (2013.01); *H04L 5/006* (2013.01); *H04L 5/0048* (2013.01);
(Continued)

(58) Field of Classification Search
None
See application file for complete search history.

(56) References Cited

U.S. PATENT DOCUMENTS 9,155,086 B2    10/2015   Nishio et al.
2009/0239476 A1  9/2009   Womack et al.
(Continued)

FOREIGN PATENT DOCUMENTS

EP    2388959 A1   11/2011
EP    2586226 A1    5/2013
(Continued)

OTHER PUBLICATIONS

Samsung, "Resource Allocation for Dynamic SRS Activation and SRS Multiplexing", 3GPP TSG RAN WG1 #60bis, Beijing, China, Apr. 12, 2010, pp. 1-3, R1-102215, 3GPP.
(Continued)

*Primary Examiner* — Diane Lo
(74) *Attorney, Agent, or Firm* — Patent Portfolio Builders, PLLC (57) ABSTRACT

A User Equipment, UE, operable to be used in a wireless communication network and a method performed by the UE for transmitting Sounding Reference Signals, SRSs are provided. The method comprises receiving (110) at least one transmission from at least one network node, and measuring (120) at least one radio quality indicator based on the received at least one transmission. The method further comprises comparing (130) the at least one measured radio quality indicator to at least a first threshold value; and transmitting, or refraining from transmitting, (140) SRSs based on a result of the comparison.

15 Claims, 5 Drawing Sheets

(51) Int. Cl.
H04W 72/08 (2009.01)
H04L 1/20 (2006.01)
H04L 25/02 (2006.01)
H04W 52/02 (2009.01)

(52) U.S. Cl.
CPC ......... *H04L 5/0085* (2013.01); *H04W 72/042* (2013.01); *H04W 72/085* (2013.01); *H04L 1/20* (2013.01); *H04L 5/001* (2013.01); *H04L 5/0035* (2013.01); *H04L 25/0226* (2013.01); *H04W 52/0225* (2013.01); *H04W 52/0245* (2013.01); *Y02B 60/50* (2013.01)

(56) References Cited

U.S. PATENT DOCUMENTS

2010/0208608 A1* 8/2010 Wang .................. H04W 52/325 370/252
2010/0232382 A1 9/2010 Gauvreau et al.
2012/0213137 A1* 8/2012 Jeong ................ H04W 52/0212 370/311
2013/0121186 A1 5/2013 Vajapeyam et al.

FOREIGN PATENT DOCUMENTS

| | | |
|---|---|---|
| EP | 2979484 A1 | 2/2016 |
| JP | 2011171972 A | 9/2011 |
| WO | 2010151196 A1 | 12/2010 |
| WO | 2011139053 A2 | 11/2011 |
| WO | 2012066736 A1 | 5/2012 |
| WO | 2013025144 A1 | 2/2013 |

OTHER PUBLICATIONS

Samsung, "Configuring SRS Transmissions in Rel.10", 3GPP TSG RAN WG1 #59bis, Valencia, Spain, Jan. 19, 2010, pp. 1-3, R1-100133, 3GPP.

* cited by examiner

USER EQUIPMENT AND A METHOD FOR TRANSMITTING SOUNDING REFERENCE SIGNALS

TECHNICAL FIELD

The present disclosure relates to transmission of signals and in particular to transmission of Sounding Reference Signals, SRSs.

BACKGROUND

Wireless communication networks and systems are growing both in the number of different services that are being provided and in the number of users using the different services. The increasing amount of users and an increasing amount of traffic in the wireless communication networks put increased demands for capacity and coverage on the networks and/or systems. One way of increasing capacity and coverage is to place more network nodes or radio base stations, RBSs, in the area covered by the wireless communication network.

More recent technologies utilise higher and higher frequencies, which experience increasing pathloss with increasing frequency. In addition, deployment in urban areas suffers from difficult propagation conditions. As a result of these factors, RBSs tend to be deployed in ever-tighter configurations, also possibly with varying output power, so-called heterogeneous network deployments.

A heterogeneous network is characterised by including several network nodes or RBSs with different transmit powers. Here the coverage areas of the low- and high-power RBSs may overlap, such that a User Equipment, UE, may receive higher downlink, DL, signal strength from the high-power RBS than from the low-power RBS, even if the UE is physically closer to the low-power RBS than to the high-power RBS. In such a situation, the UE also has a smaller pathloss to the low-power RBS than to the high-power RBS. The UE thus has its best downlink to the high-power node while the best uplink, UL, is to the low-power RBS.

The area in which the UE is physically present can thus be covered by several RBSs, which form individual cells, i.e. coverage areas of the RBSs. By periodically measuring a signal strength from several RBSs, the UE is enabled to select which RBS it should be connected to, or served by. The process of changing connected/serving RBSs for reception and transmission is referred to as a handover. Other forms of heterogeneous networks are the so called "shared cells" where low power RBSs do not constitute individual cells and they share the same cell-ID as the dominant macro RBS, i.e. the high-power RBS.

In a heterogeneous network scenario, it may be beneficial to associate the UL and the DL to different RBSs, so-called "UL/DL decoupling". In a system that utilises coordinated multipoint, CoMP, transmission and/or reception this is further generalised in the sense that several transmission, Tx, points (i.e. physical antenna sites) and/or several reception, Rx, points are potentially used to serve a single UE. The Tx and Rx points need not be the same but the sets can (partially) overlap.

In the $3^{rd}$ Generation Partnership Project, 3GPP Long Term Evolution, LTE, standard, the UE has the ability to transmit so-called Sounding Reference Signals, SRS, on the UL. These are used by the RBS to estimate a channel quality for a given UE, and the estimates are used by the RBS, or a scheduler, to place subsequent UL transmissions on the best possible part of the frequency band, also called frequency selective scheduling. In the context of UL/DL decoupling they could also be used to select which RBS(s) to associate the UL transmission to.

SRS may also be used in downlink for co-ordinated scheduling and transmission point selection. This is particularly feasible in a shared cell deployment where fast coordination is inherited from the architecture with the centralised common RBS, or eNB. Measurements done in downlink by the UE may be delayed by measurement reporting.

For Time Division LTE, TD-LTE, channel reciprocity can be exploited to perform beamforming in the downlink. Channel knowledge is obtained using uplink SRS.

SRS was initially introduced in the LTE standard with the purpose of allowing UL link adaptation. However, new deployments and technologies such as shared cell and CoMP may exploit UL measurements based on SRS for additional purposes, such as mobility and either transmit or receive point selection. Such new applications may introduce increased load on SRS, since more UEs than initially considered need to access the common SRS resource pool (at least in synchronised network deployments). Therefore, SRS capacity limitation may appear in new deployments.

Furthermore it becomes important to control SRS cost signalling overhead. It also delays the time to switch on SRS, alternatively requires larger margins. This can be crucial in dense networks with small cells and for mobiles with high speed.

SUMMARY

The object is to obviate at least some of the problems outlined above. In particular, it is an object to provide a User Equipment, UE, operable to be used in a wireless communication network and a method performed by the UE for transmitting Sounding Reference Signals, SRSs. These objects and others may be obtained by providing a UE and a method performed by a UE according to the appended independent claims.

According to an aspect, a method performed by a UE operable to be used in a wireless communication network for transmitting SRSs is provided. The method comprises receiving at least one transmission from at least one network node, and measuring at least one radio quality indicator based on the received at least one transmission. The method further comprises comparing the at least one measured radio quality indicator to at least a first threshold value; and transmitting, or refraining from transmitting, SRSs based on a result of the comparison.

According to an aspect, a UE adapted to be used in a wireless communication network and adapted for transmitting SRSs is provided. The UE comprises a receiving unit adapted for receiving at least one transmission from at least one network node; and a measuring unit adapted for measuring at least one radio quality indicator based on the received at least one transmission. The UE further comprises a comparing unit adapted for comparing the at least one measured radio quality indicator to at least a first threshold value; and a transmitting unit adapted for transmitting, or refraining from transmitting, SRSs based on the comparison.

The UE and the method performed by the UE have several advantages. One advantage is that the transmission of SRS may be tailored to depend on radio resource features and coordination of transmission of SRS may be facilitated. It may provide fast turning on and off transmission of SRS. It provides for autonomous UE control of SRS transmission which saves signalling resources.

BRIEF DESCRIPTION OF DRAWINGS

Embodiments will now be described in more detail in relation to the accompanying drawings, in which.

DETAILED DESCRIPTION

Briefly described a UE and a method performed by the UE, which UE is operable to be used in a wireless communication network for transmitting SRSs are provided. The UE is adapted to determine when to transmit SRSs and when not to transmit SRSs based on e.g. different circumstances.

SRS may be used for many purposes and features. In many cases it is most useful around a cell edge where there is largest cell (i.e. coverage area of a network node) overlap. In this area the selection of best transmission and reception points to use can change fast. Also in this area, the co-channel interference is strongest and coordination gains the largest. By coordination gains is meant gains from coordinating network nodes. In other areas of the cell, such as in the cell centre, the use of SRS may be less valuable.

Figure 1A:
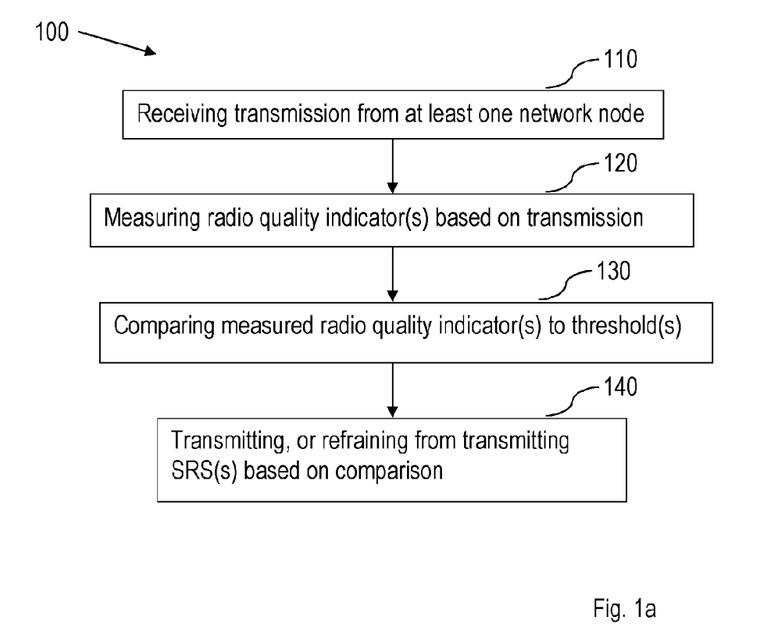
FIG. 1a is a flowchart of a method performed by a UE for transmitting SRSs according to an exemplifying embodiment.

An exemplifying embodiment of a method performed by a UE for transmitting SRSs will now be described with reference to FIGS. 1a and 1b. FIG. 1a illustrates the method comprising receiving 110 at least one transmission from at least one network node, and measuring 120 at least one radio quality indicator based on the received at least one transmission. The method further comprises comparing 130 the at least one measured radio quality indicator to at least a first threshold value; and transmitting, or refraining from transmitting, 140 SRSs based on a result of the comparison.

The UE may receive transmissions from more than one network node (or RBS or eNB). In case the UE is located in an area covered by more than one network node, the UE may receive transmissions from more than one network node. In case the UE is located in an area covered by only one network node, the UE may receive transmission(s) only by the one network node. The UE uses the received at least one transmission to measure at least one radio quality indicator for the received at least one transmission. The radio quality indicator will be described in more detail below, but is an indicator (or parameter) that may be measured by the UE in order to obtain knowledge of the channel quality for the received at least one transmission. Once the UE has measured the radio quality indicator, the UE compares it to a first threshold. The radio quality indicator may either differ from the first threshold or be the same as the first threshold. In other words, a value of the radio quality indicator may either be lower, higher or equal to a value of the first threshold. The UE then transmits, or refrains from transmitting, SRSs based on the result of the comparison between the radio quality indicator and the first threshold.

For example, the UE may transmit SRS when the value of the radio quality indicator is higher than the value of the first threshold, or the UE may transmit SRS when the value of the radio quality indicator is equal to or higher than the value of the first threshold. When the value of the radio quality indicator is below (or equal to) the value of the first threshold, the UE may refrain from transmitting SRS. In another example, the UE may refrain from transmitting SRS when the value of the radio quality indicator is higher than the value of the first threshold, or the UE may refrain from transmitting SRS when the value of the radio quality indicator is equal to or higher than the value of the first threshold. When the value of the radio quality indicator is below (or equal to) the value of the first threshold, the UE may transmit SRS.

The method performed by the UE may have several advantages. One possible advantage is that the transmission of SRS may be tailored to depend on radio resource features and coordination of transmission of SRS may be facilitated. It may provide fast turning on and off transmission of SRS. It provides for autonomous UE control of SRS transmission which saves signalling resources.

When the comparison results in transmitting SRSs, the method may further comprise determining an SRS pattern according to which the SRSs shall be transmitted, based on at least one of the at least one measured radio quality indicator and the result of the comparison; and transmitting the SRSs according to the determined SRS pattern.

The UE may transmit SRS according to different patterns or configurations. The different patterns or configurations may comprise e.g. frequent SRS transmissions and sparse SRS transmissions. Note that other examples of SRS patterns or SRS configurations are possible, e.g. pattern in time and pattern in frequency. The UE may determine which SRS pattern to use for transmitting SRSs based on at least one of the at least one measured radio quality indicator and the result of the comparison. As described above, the UE may receive several transmissions, but at least one transmission. In case the UE receives several transmissions and thus measures at least one radio quality indicator for each of the received transmissions, the UE determines which SRS pattern to use for transmitting SRSs based on at least one of the plurality of measured radio quality indicators for each of the received transmissions and the result of the comparison. In case the UE only receives one transmission, the UE measures at least one radio quality indicator for the one received transmission and determines which SRS pattern to use for transmitting SRSs based on at least one measured radio quality indicator for the one received transmission and the result of the comparison.

It is pointed out that there may be a plurality of different SRS patterns or SRS configurations according to which the UE transmits SRS, and not just two. As mentioned above, the SRS pattern may comprise SRSs in a dense pattern or a sparser pattern. This can be both in time and frequency. A denser pattern improves the measurement quality but costs more overhead leaving fewer symbols for uplink data transmission. The feature for which the SRS shall be used also determines the pattern. For example, a denser pattern in frequency can improve frequency selecting scheduling performance and a denser pattern in time will improve link adaptation by less outdated measurements. When SRS is used for several features the areas where each feature will gain can differ. Selecting SRS pattern based on different thresholds will then enable a good trade-off between coordination gain and SRS overhead cost.

The determined SRS pattern may comprise SRSs located over the whole frequency bandwidth of the communication network or SRSs located over a part of the whole frequency bandwidth of the communication network.

This is another example of an SRS pattern, wherein the SRS pattern is wideband and narrowband transmissions of SRS. Based on the measured at least one radio quality indicator and the result of the comparison, the UE transmits SRS in a narrowband fashion or in a wideband fashion. A narrowband transmission of SRSs may correspond to a frequency band allotted or assigned to the UE by a network node, or any other part of the whole frequency bandwidth. A broadband transmission of SRS may correspond to e.g. a system bandwidth, i.e. the bandwidth of the wireless communication network in which the UE operates.

Merely as an example, in case the UE is in an area where frequency selective scheduling is desired a wideband SRS is transmitted while if the UE is an area with downlink transmission point selection is desired a narrowband SRS is sufficient and transmitted.

According to an embodiment, the determined SRS pattern comprises SRSs on at least one of the carriers in a multi-carrier radio transmission technique.

The demands on data rates are continuously increasing. In order to achieve high data rates it is necessary to increase the transmission bandwidths over those that can be supported by a single carrier or channel. One solution is termed carrier aggregation, CA, (or sometimes channel aggregation). Using LTE Advanced carrier aggregation, it is possible to utilise more than one carrier and in this way increase the overall transmission bandwidth. The carriers (or channels) may be in contiguous elements of the spectrum, or they may be in different bands. When the UE employs a multicarrier radio transmission technique such as CA, the UE may determine to transmit SRSs on one or more of the carriers based on the measured at least one radio quality indicator and the result of the comparison. In other words, there are different SRS patterns, or configurations, which each define which carriers are to be used for transmitting SRSs. All transmission points may not be equipped and configured with all carriers. Thereby the cell edge and areas with coordination gain can differ between different carriers and the SRS transmission pattern could then be transmitted only on the carriers for which the UE could benefit from coordination.

According to still an embodiment, the SRSs are transmitted when the at least one measured radio quality indicator has reached or crossed the first threshold value and the SRSs are not transmitted when the at least one measured radio quality indicator has reached or crossed a second threshold value.

Instead of having just one threshold (the first) as described above, the UE may make use of two thresholds. Merely as an example, the value of the first threshold is higher than the value of the second threshold and the UE transmits SRS, or transmits SRS according to a first SRS pattern, as the value of the at least one measured radio quality indicator is above the first threshold. The UE receives a transmission from one network node and measures at least one radio quality indicator based on the received transmission. The value of the at least one measured radio quality indicator has now dropped below the first threshold but is still above the second threshold, i.e. the at least one measured radio quality indicator has reached and also crossed the first threshold value. The UE continues transmitting SRS, or alternatively changes SRS pattern such that the UE transmits SRS according to a second SRS pattern.

The UE receives yet a transmission from the network node, measures at least one radio quality indicator based on the received transmission. The value of the at least one measured radio quality indicator has now dropped below the second threshold and the UE then refrains from transmitting SRS, or alternatively changes SRS pattern such that the UE transmits SRS according to a third SRS pattern.

It shall be pointed out that the above example is merely an example to illustrate how the different thresholds may be used and the value of the first threshold may alternatively be lower than the value of the second threshold.

Reverting to the above example, the UE then receives yet another transmission from the network node and the value of the at least one measured radio quality indicator has increased and thus both reached and also crossed the second threshold value, but is still below the first threshold value. However, the UE still refrains from transmitting SRSs, or alternatively changes SRS pattern to the second SRS pattern. Then, the UE again receives a transmission and now the value of the at least one measured radio quality indicator has now increased further and reached and also crossed the first threshold value. The UE then starts transmitting SRSs, or alternatively changes SRS pattern to the first SRS pattern.

The different thresholds may correspond to a "turn on" threshold and a "turn off" threshold wherein both thresholds has to be reached and/or crossed in order to start transmitting or to stop transmitting SRSs. In case of several consecutive received transmissions result in the value of the at least one measured radio quality indicator fluctuating around one threshold but does not cross both threshold values, the UE does not change its state between transmitting or not-transmitting SRSs.

The two threshold values may also constitute respective "switching points" where the UE changes SRS patterns when a threshold is reached and/or crossed. It shall be pointed out that in case the threshold values corresponds to respective "switching points" where the UE changes SRS patterns when a threshold is reached and/or crossed, there may be more than two thresholds wherein each threshold corresponds to respective "switching points". In other words, there may be as many thresholds as there are SRS patterns or SRS configurations.

Comparing the at least one measured radio quality indicator to the first threshold value may comprise determining if the measured radio quality indicator has reached or crossed the threshold, and wherein the transmitting, or refraining from transmitting, SRSs is based on the measured radio quality indicator having reached or crossed the threshold value.

According to an embodiment, the at least one radio quality indicator that is measured is at least one of Reference Signal Received Power, RSRP; signal strength of Channel State Information Reference Signal, CSI-RS; Channel Quality Indicator, CQI; interference, and Signal to Interference and Noise Ratio, SINR.

These are different examples of a radio quality indicator that the UE may measure when it receives a transmission from at least one network node. From the radio quality indicator, different information may be deduced. For example, the RSRP may be used to deduce information of where the UE is located with respect to the at least one network node. Hence radio conditions towards at least one network node and the UE may be deduced. Therefore, the first and the second thresholds may be configured as RSRP thresholds, wherein the UE transmits or refrains from transmitting SRS based on its location in relation to the at least one network node.

Assume the UE receives transmissions from at least two different network nodes. The UE then measures RSRP based on the received transmissions. The difference between RSRP from the different network nodes may then be a good indication of how close to cell edge the UE is. A cell is a coverage area of a network node. In an example, the UE receives transmissions from a network node to which the UE is connected and the UE also receives transmissions from neighbouring network nodes. The UE measures or estimates RSRP for both the transmission from the network node to which the UE is connected and the transmissions from neighbouring network nodes. Based on the difference in RSRPs from the two network nodes, a neighbour geometry is measured, or deduced. A per neighbour geometry can be measured or deducted for each neighbouring network node.

Optionally, the UE either comprises or receives a list of Physical Cell Identities, PCIs, which identifies the network node to which the UE is connected and the neighbouring network nodes. The UE may measure RSRPs for transmissions received from network nodes in the list of PCIs.

The UE then compares the deduced geometry to a first and a second threshold, corresponding to a "turning on" threshold and a "turning off" threshold and may e.g. start transmitting SRSs if the geometry is below the "turning on" threshold or stop transmitting SRSs if the geometry is above the "turning off" threshold.

A total geometry may be deduced as a quota between RSRP from the network node to which the UE is connected and a linear sum of all detected neighbouring network nodes. The total geometry may then be used as a measure to trigger SRSs, i.e. the transmission of SRSs or refraining from transmitting SRSs.

Alternatively, only the RSRP of the transmissions received from the network node to which the UE is connected may be used as a measure. A low RSRP indicates the need for an alternative transmission point, or network node, and may then trigger the transmission of SRSs which will facilitate the possibility to select another downlink transmission point based on measuring SRS.

The use of PCI to only consider some of the neighbouring network nodes may be used for example when there is coordination possibilities between some network nodes only. The SRS may then not be useful when the UE approach another network node without any coordination possibilities. See the example in FIG. 3b, network node 301 and 310 are controlled by the same eNB 1 while network node 320 is controlled by eNB 2. There can be coordination features within eNB 1 and then between network nodes 301 and 310 that cannot be done between network node 310 and 320. UE 311 is on the cell boarder between cells, or coverage area of network nodes 301 and 310 and SRS is turned on to facilitate coordination. UE 312 experiences the same RSRP difference as UE 311 can distinguish the difference based on PCI discrimination and does not turn on SRS, i.e. does not start transmitting SRSs.

Other radio quality indicators can be used to detect when the UE is close to the cell edge where it is beneficial to transmit SRS. When shared cell ID (also called Combined Cell ID) is used, RSRP based geometry is not suitable to use, there is only one common PCI and Common Reference Signal, CRS. Another measure is then more suitable to be used to indicate if the UE is in an area where SRS is useful. CSI-RS signal strength and difference between CSI-RS transmitted from different network nodes may be used. When there is small difference, the UE is in an area where alternative transmission/reception points may be better and SRS may then be triggered to enable uplink based downlink transmission point selection. Downlink SINR or CQI may also be used as measures of a radio quality indicator. A low SINR or CQI indicate interference from another network node, or transmission point, and a possible gain from transmission point coordinated scheduling. Also downlink interference can be used similarly to SINR and CQI.

It shall be pointed out that the UE measures at least one radio quality indicator based on the received at least one transmission. In other words, combinations of the different examples of RSRP, CQI, CSI-RS and SINR may be possible. For example, the UE transmits SRSs when both CQI is relatively low and the RSRP is relatively high. A low CQI indicates possible interference. If, at the same time the RSRP is high, then this distinguishes interference from bad coverage e.g. when the RSRP is low.

According to still an embodiment, the method further comprises receiving the at least one threshold value from the at least one network node.

The at least one threshold value may either be stored in the UE or it may alternatively be received from the network node to which the UE is connected. The network may comprise network nodes of different transmission powers and the network nodes may not be symmetrically placed throughout the communication network. Further, due to e.g. buildings, hills and other obstacles, the radio coverage may vary for different network nodes. Hence, depending on which network node is serving the UE, i.e. to which network node the UE is connected, different threshold values may be suitable to use. Hence, the network node to which the UE is connected may send threshold values valid for the network node to the UE. Optionally, the network node may also send a PCI list to the UE. In this manner, the UE is able to make decisions on whether to transmit SRSs or not and/or to make decisions on which SRS pattern to use for transmitting SRSs depending on which network node the UE is connected to. Also the configuration of the SRS patterns and t filter parameters may be sent from the network node. For LTE the configurations may be sent as RRC (Radio Resource Control) message to each UE or as a broadcast message to all UE in a cell as cell information on the BCCH (broadcast control channel) or a combination of broadcast cell configuration with some UE individual configurations.

Figure 1B:
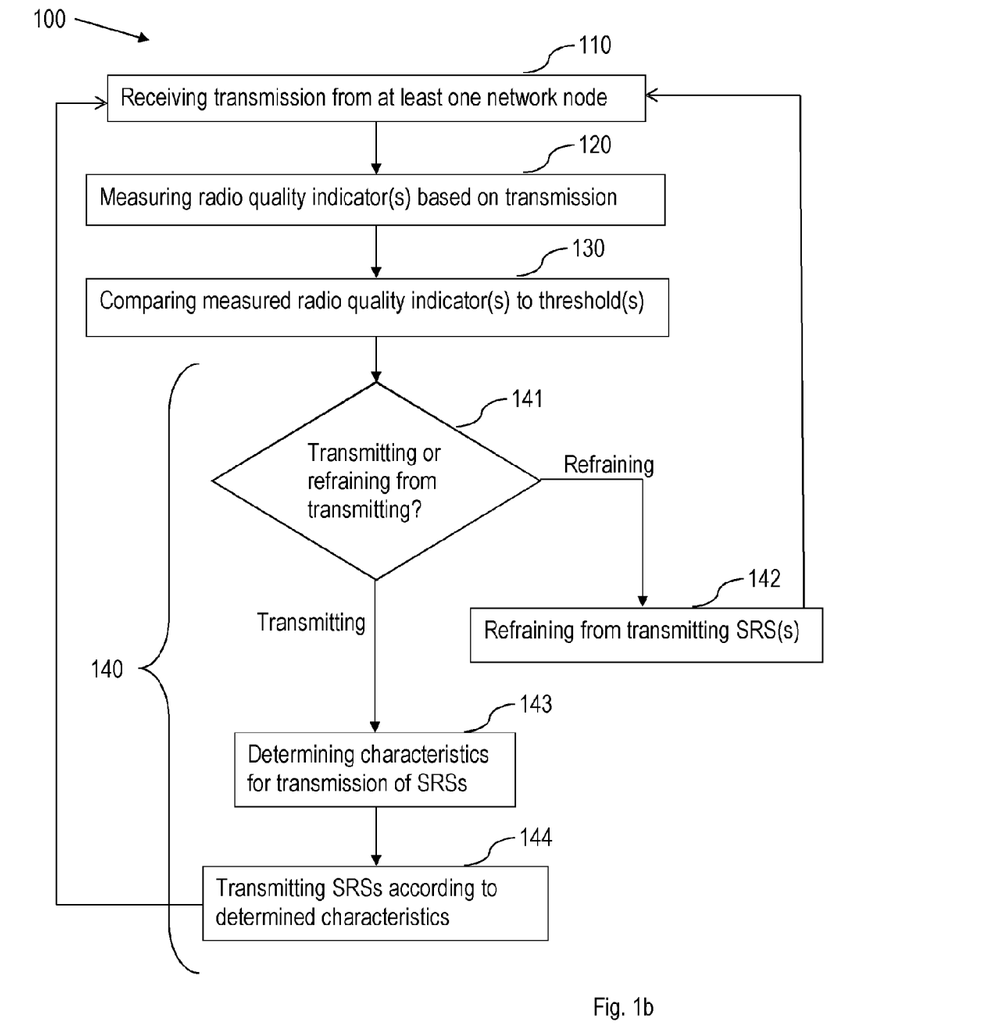
FIG. 1b is a flowchart of a method performed by a UE for transmitting SRSs according to yet an exemplifying embodiment.

FIG. 1b is a flowchart of a method performed by a UE for transmitting SRSs according to yet an exemplifying embodiment. The flowchart in FIG. 1b is a more detailed example of the flowchart in FIG. 1a. In FIG. 1b, different options for action 140 are illustrated, i.e. different options for transmitting, or refraining from transmitting, SRSs based on a result of the comparison between the at least one measured radio quality indicator to at least a first threshold value.

In the example illustrated in FIG. 1b, the UE determines whether or not to transmit SRSs based on the comparison, illustrated by action 141. If the UE determines to refrain from transmitting SRSs, then the UE refrains 142 from transmitting SRSs until a subsequent transmission is received 110 wherein the UE measures 120 at least one radio quality indicator based on the received subsequent transmission, compares 130 the at least one measured radio quality indicator to at least a first threshold value; and determines 141 to transmit SRSs based on a result of the comparison. When the UE determines to transmit SRS, the UE determines 143 characteristics for transmission of SRSs. Determining characteristics for transmission of SRSs may comprise determining an SRS pattern or SRS configuration to use for transmitting SRS. Then the UE transmits 144 SRSs according to the determined characteristics.

Figure 3A:
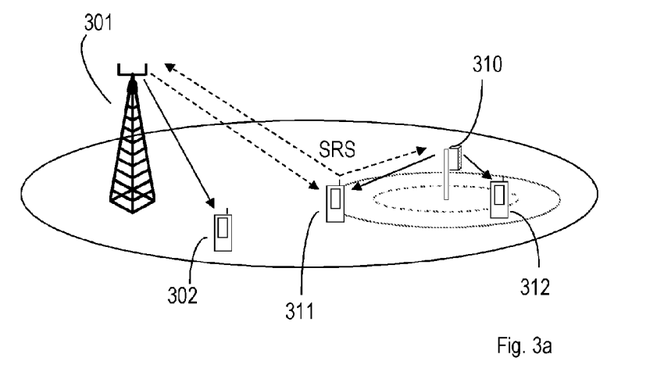
FIG. 3a is an illustration of an example of a scenario when a UE transmits SRSs.
Figure 3B:
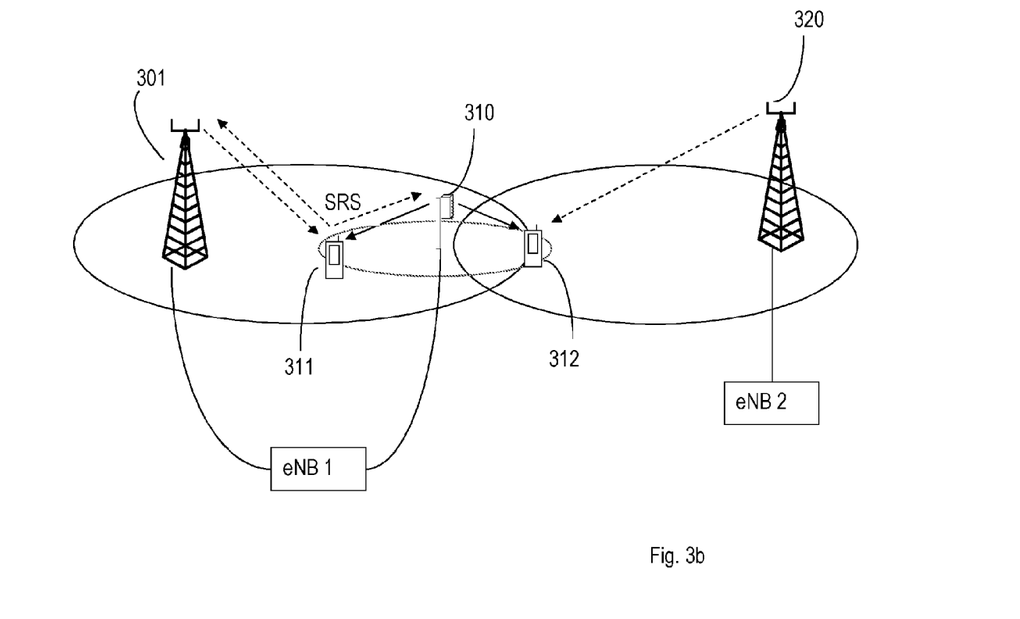
FIG. 3b is an illustration of still an example of a scenario when a UE transmits SRSs.

FIG. 3a is an illustration of an example of a scenario when a UE transmits SRSs. UEs 302 and 312 are far away from the cell edge and coordination of the two network nodes 301 and 310 may be less feasible. UE 311 on the other hand is in an area where there is potentially strong interference from the non-connected network node. There may be a gain by coordinating scheduling between the two network nodes. To improve the measure for coordination, SRS may be used. To save uplink capacity only UE 311 should transmit SRSs. The different UEs may detect if they are in the area where SRS should be turned on by measuring downlink signals/transmissions as described above.

The UE may, based on downlink measurements, identify when it is in an area where SRS is of large use and when not. This may as well be configured from the network side by setting up rules when to turn on SRS and when to turn it off, e.g. by sending different threshold values to the UE identifying when the UE should transmit SRSs and when the UE should refrain from transmitting SRSs.

The UE may also receive filtering parameters from the network node to which the UE is connected. Filtering may be done by hysteresis, time-to-trigger (the threshold must be exceeded a certain time) or more traditional time filters such as layer 3 filtering similar to that is used for handover triggering. The filtering may also be set to constraint on which measures and network nodes that should be included. Time filtering and constraint on measures may be applied continuously. Hysteresis may be applied when comparing the measured radio quality indicator to the threshold(s).

Embodiments herein also relate to a UE adapted to be used in a wireless communication network and adapted for transmitting SRSs. The UE has the same technical features, objects and advantages as the method performed by the UE. The UE will only be described in brief in order to avoid unnecessary repetition.

Figure 2:
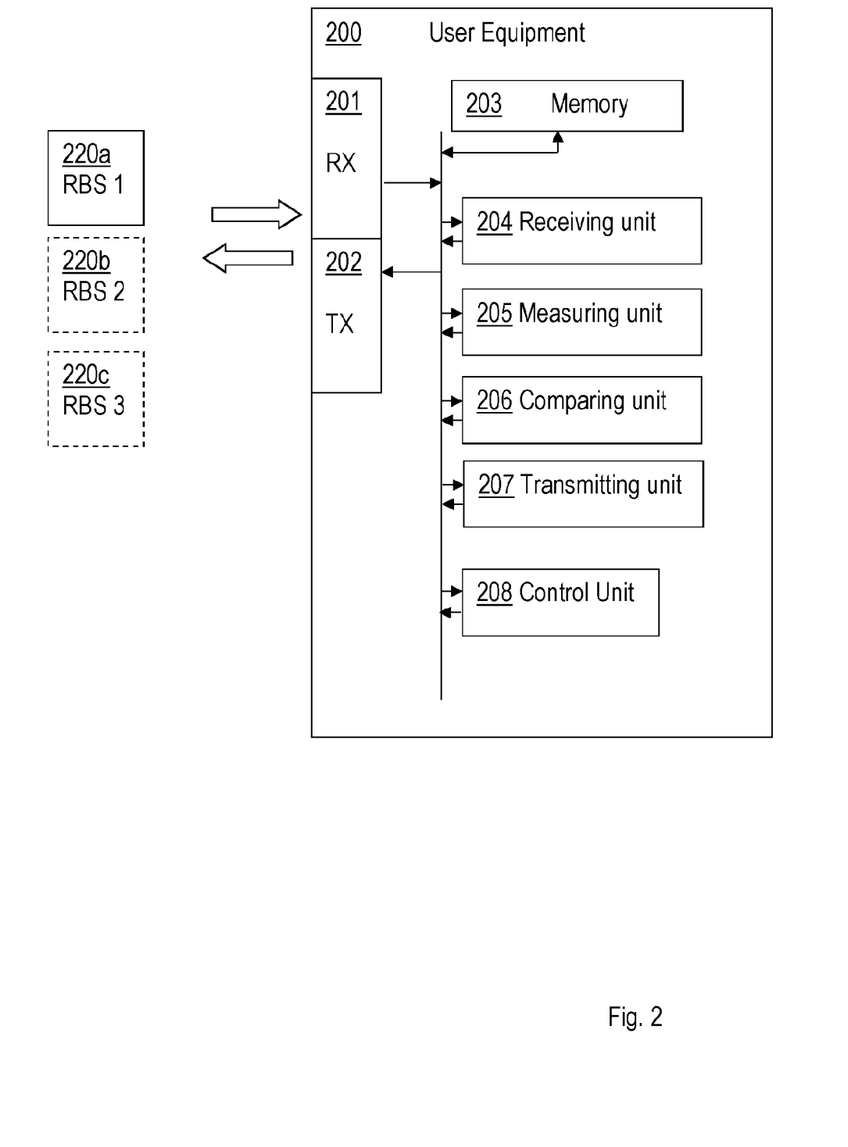
FIG. 2 is a block diagram of a exemplary UE adapted for transmitting SRSs according to an exemplifying embodiment.

Such a UE will now briefly be described with reference to FIG. 2. FIG. 2 illustrates the UE comprising a receiving unit 204 adapted for receiving at least one transmission from at least one network node; and a measuring unit 205 adapted for measuring or estimating at least one radio quality indicator based on the received at least one transmission. The UE further comprises a comparing unit 206 adapted for comparing the at least one measured radio quality indicator to at least a first threshold value; and a transmitting unit 207 adapted for transmitting, or refraining from transmitting, SRSs based on the comparison.

FIG. 2 illustrates also the UE 200 comprising a memory 203 and a control unit 208 corresponding to a processing unit. In other words, the UE 200 comprises a processor 208 and a memory 203, said memory comprising instructions executable by said processor 208 whereby said UE 200 is operative to receive at least one transmission from at least one network node, and to measure at least one radio quality indicator based on the received at least one transmission. The memory further comprises instructions executable by the processor 208 whereby the UE 200 is operative to compare the at least one measured radio quality indicator to at least a first threshold value; and to transmit, or to refrain from transmitting, SRSs based on a result of the comparison.

The UE has the same advantages as the method performed by the UE. One advantage is that the transmission of SRS may be tailored to depend on radio resource features and coordination of transmission of SRS may be facilitated. It may provide fast turning on and off transmission of SRS. It provides for autonomous UE control of SRS transmission which saves signalling resources.

When the comparison results in transmitting SRSs, the transmitting unit 207 may further be adapted for determining an SRS pattern according to which the SRSs shall be transmitted, based on at least one of the at least one measured radio quality indicator and the result of the comparison; and transmitting the SRSs according to the determined SRS pattern.

The determined SRS pattern may comprise SRSs located over the whole frequency bandwidth of the communication network or SRSs located over a part of the whole frequency bandwidth of the communication network.

The determined SRS pattern may comprise SRSs on at least one of the carriers in a multicarrier radio transmission technique.

In an example, the transmitting unit 207 further is adapted for transmitting the SRSs when the at least one measured radio quality indicator has reached or crossed the first threshold value and for not transmitting the SRSs when the at least one measured radio quality indicator has reached or crossed a second threshold value.

The comparing unit 206 may be adapted for comparing the at least one measured radio quality indicator to the first threshold value by determining if the measured radio quality indicator has reached or crossed the threshold, and wherein the transmitting unit 207 further is adapted for transmitting, or refraining from transmitting, SRSs based on the measured radio quality indicator having reached or crossed the threshold value.

The at least one radio quality indicator that is measured may be at least one of RSRP, CSI-RS, CQI, interference and SINR.

The receiving unit 204 may further be adapted for receiving the at least one threshold value from the at least one network node.

In FIG. 2, the UE 200 is also illustrated comprising a receiving arrangement RX 201 and a transmitting arrangement TX 202. Through these two arrangements, the UE 200 is adapted to communicate with other nodes and/or entities in the wireless communication network. The receiving arrangement 201 may comprise more than one receiving arrangement. For example, the receiving unit may be connected to both a wire and an antenna, by means of which the UE 200 is enabled to communicate with other nodes and/or entities in the wireless communication network. Similarly, the transmitting arrangement 202 may comprise more than one transmitting arrangement, which in turn is connected to both a wire and an antenna, by means of which the UE 200 is enabled to communicate with other nodes and/or entities in the wireless communication network. The UE 200 further comprises a memory 203 for storing data. Further, the UE 200 is illustrated comprising a control or processing unit 208 which in turns is connected to the different units 204-207. It shall be pointed out that this is merely an illustrative example and the UE 200 may comprise more, less or other units or modules which execute the functions of the UE 200 in the same manner as the units illustrated in FIG. 2.

It should be noted that FIG. 2 merely illustrates various functional units in the UE 200 in a logical sense. The functions in practice may be implemented using any suitable software and hardware means/circuits etc. Thus, the embodiments are generally not limited to the shown structures of the UE 200 and the functional units. Hence, the previously described exemplary embodiments may be realised in many ways. For example, one embodiment includes a computer-readable medium having instructions stored thereon that are executable by the control or processing unit 208 for executing the method steps in the UE 200. The instructions executable by the computing system and stored on the computer-readable medium perform the method steps of the UE 200 as set forth in the claims.

Figure 4:
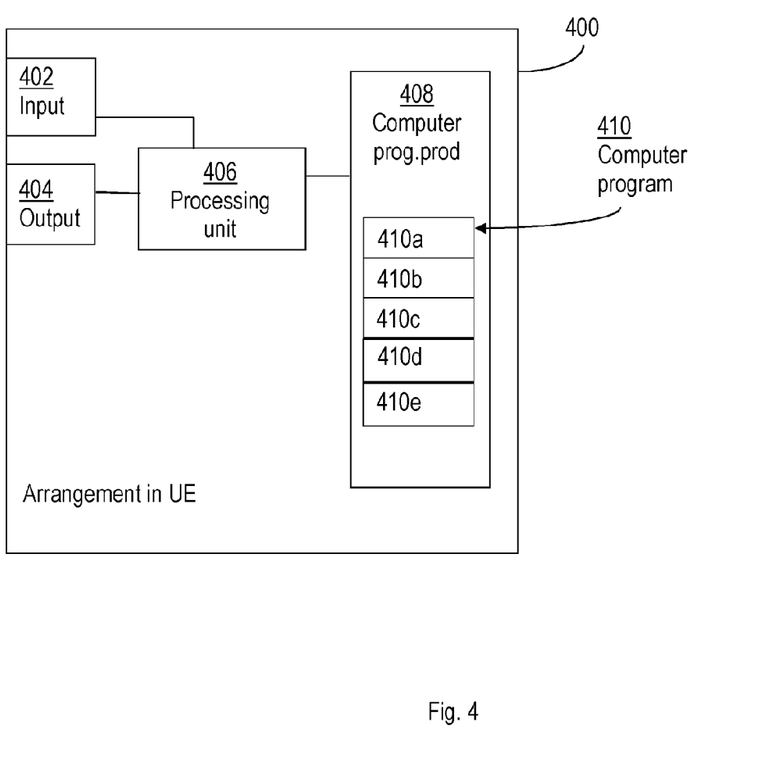
FIG. 4 is a block diagram of an arrangement in a UE adapted for transmitting SRSs according to an exemplifying embodiment.

FIG. 4 schematically shows an embodiment of a UE 400. Comprised in the UE 400 are here a processing unit 406, e.g. with a DSP (Digital Signal Processor). The processing unit 406 may be a single unit or a plurality of units to perform different actions of procedures described herein. The UE 400 may also comprise an input unit 402 for receiving signals from other entities, and an output unit 404 for providing signal(s) to other entities. The input unit and the output unit may be arranged as an integrated entity or as illustrated in the example of FIG. 2, as one or more interfaces 201/202.

Furthermore, the UE 400 may comprise at least one computer program product 408 in the form of a non-volatile memory, e.g. an EEPROM (Electrically Erasable Programmable Read-Only Memory), a flash memory and a hard drive. The computer program product 408 comprises a computer program 410, which comprises code means, which when executed in the processing unit 406 in the UE 400 causes the UE 400 to perform the actions e.g. of the procedure described earlier in conjunction with FIG. 1a.

In other words the UE 400 comprises a processor and memory containing instructions executable by the processor whereby the UE 400 is operative to receive at least one transmission from at least one network node; measure at least one radio quality indicator based on the received at least one transmission; compare the at least one measured radio quality indicator to at least a first threshold value, and to transmit or refraining from transmitting SRSs based on a result of the comparison The computer program 410 may be configured as a computer program code structured in computer program modules 410a-410e. Hence, in an exemplifying embodiment, the code means in the computer program of the UE 400 comprises a receiving unit, or module, for receiving at least one transmission from at least one network node. The computer program further comprises a measuring unit, or module, for measuring at least one radio quality indicator based on the received at least one transmission. The computer program further comprises a comparing unit, or module, for comparing the at least one measured radio quality indicator to at least a first threshold value; and a transmitting unit, or module, for transmitting, or refraining from transmitting, SRSs based on a result of the comparison.

The computer program modules could essentially perform the actions of the flow illustrated in FIG. 1a, to emulate the UE 400. In other words, when the different computer program modules are executed in the processing unit 406, they may correspond to the units 204-207 of FIG. 2.

Although the code means in the embodiments disclosed above in conjunction with FIG. 2 is implemented as computer program modules which when executed in the respective processing unit causes the UE to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the UE.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a User Equipment (UE) operable to be used in a wireless communication network for transmitting Sounding Reference Signals (SRSs), the method comprising the UE:
   receiving at least one transmission from at least one network node;
   measuring at least one radio quality indicator based on the received at least one transmission;
   comparing the at least one measured radio quality indicator to a first threshold value and a second threshold value; and
   transmitting, or refraining from transmitting, the SRSs based on a result of the comparison,
   wherein when the comparison results in transmitting the SRSs, the method further comprises:
   determining an SRS pattern, according to which the SRSs shall be transmitted, based on at least one of the at least one measured radio quality indicator and the result of the comparison; and
   transmitting the SRSs according to the determined SRS pattern.

2. The method of claim 1, wherein the determined SRS pattern comprises the SRSs located over whole frequency bandwidth of the wireless communication network or the SRSs located over a part of the whole frequency bandwidth of the wireless communication network.

3. The method of claim 1, wherein the determined SRS pattern comprises the SRSs on at least one carrier of multiple carriers in a multicarrier radio transmission technique.

4. The method of claim 1, wherein the SRSs are transmitted when the at least one measured radio quality indicator has reached or crossed the first threshold value and the SRSs are not transmitted when the at least one measured radio quality indicator has reached or crossed the second threshold value.

5. The method of claim 1:
   wherein the comparing the at least one measured radio quality indicator to the first threshold value and the second threshold value comprises determining if the at least one measured radio quality indicator has reached or crossed the first threshold value and the second threshold value, and wherein the transmitting, or refraining from transmitting, the SRSs is based on the at least one measured radio quality indicator having reached or crossed the first threshold value and the second threshold value.

6. The method of claim 1, wherein the at least one radio quality indicator that is measured is at least one of:

Reference Signal Received Power (RSRP);

signal strength of Channel State Information Reference Signal (CSI-RS);

Channel Quality Indicator (CQI);

interference; and

Signal to Interference and Noise Ratio (SINR).

7. The method of claim 1, further comprising receiving at least the first threshold value or the second threshold value from the at least one network node.

8. A User Equipment (UE) adapted to be used in a wireless communication network and adapted for transmitting Sounding Reference Signals (SRSs), the UE comprising:

a receiving circuit configured to receive at least one transmission from at least one network node;

a measuring circuit configured to measure at least one radio quality indicator based on the received at least one transmission;

a comparing circuit configured to compare the at least one measured radio quality indicator to a first threshold value and a second threshold value; and a transmitting circuit configured to transmit, or refrain from transmitting, the SRSs based on the comparison, wherein when the comparison results in transmitting the SRSs, the transmitting circuit is further configured to:

determine an SRS pattern, according to which the SRSs shall be transmitted, based on at least one of the at least one measured radio quality indicator and the result of the comparison; and transmit the SRSs according to the determined SRS pattern.

9. The UE of claim 8, wherein the determined SRS pattern comprises the SRSs located over whole frequency bandwidth of the wireless communication network and the SRSs located over a part of the whole frequency bandwidth of the wireless communication network.

10. The UE of claim 8, wherein the determined SRS pattern comprises the SRSs on at least one carrier of multiple carriers in a multicarrier radio transmission technique.

11. The UE of claim 8, wherein the transmitting circuit is further configured to:

transmit the SRSs when the at least one measured radio quality indicator has reached or crossed the first threshold value; and not transmit the SRSs when the at least one measured radio quality indicator has reached or crossed the second threshold value.

12. The UE of claim 8:

wherein the comparing circuit is configured to compare the at least one measured radio quality indicator to the first threshold value and the second threshold value by determining if the at least one measured radio quality indicator has reached or crossed the first threshold value and the second threshold value; and wherein the transmitting circuit is further configured to transmit, or refrain from transmitting, the SRSs based on the at least one measured radio quality indicator having reached or crossed the first threshold value and the second threshold value.

13. The UE of claim 8, wherein the at least one radio quality indicator that is measured is at least one of:

Reference Signal Received Power (RSRP);

signal strength of Channel State Information Reference Signal (CSI-RS);

Channel Quality Indicator (CQI);

interference; and

Signal to Interference and Noise Ratio (SINR).

14. The UE of claim 8, wherein the receiving circuit is configured to receive at least the first threshold value or the second threshold value from the at least one network node.

15. A computer program product stored in a non-transitory computer readable medium for controlling transmission of Sounding Reference Signals (SRSs) by a User Equipment (UE), the UE operable to be used in a wireless communication network, the computer program product comprising software instructions which, when run on a processing circuit of the UE, causes the UE to:

receive at least one transmission from at least one network node;

measure at least one radio quality indicator based on the received at least one transmission;

compare the at least one measured radio quality indicator to a first threshold value and a second threshold value; and transmit, or refrain from transmitting, the SRSs based on a result of the comparison, wherein when the comparison results in transmitting the SRSs, the UE is further caused to:

determine an SRS pattern, according to which the SRSs shall be transmitted, based on at least one of the at least one measured radio quality indicator and the result of the comparison; and transmit the SRSs according to the determined SRS pattern.

* * * * *